(12) United States Patent
Jonsson et al.

(10) Patent No.: US 6,181,936 B1
(45) Date of Patent: Jan. 30, 2001

(54) SYSTEM AND METHOD FOR ACCESSING MOBILE NETWORKS

(75) Inventors: Björn Erik Rutger Jonsson, Järfalla; Jan Ingemar Swerup, Knivsta, both of (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 09/028,268

(22) Filed: Feb. 23, 1998

(51) Int. Cl.[7] .................................................. H04Q 7/22
(52) U.S. Cl. .................................. 455/433; 455/445
(58) Field of Search ............................ 455/433, 552, 455/445, 414, 432

(56) References Cited

U.S. PATENT DOCUMENTS

| | | | |
|---|---|---|---|
| 4,112,257 | 9/1978 | Frost | 179/2 EB |
| 5,315,636 | 5/1994 | Patel | 379/58 |
| 5,544,224 | 8/1996 | Jonsson et al. | 379/58 |
| 5,548,636 | 8/1996 | Bannister et al. | 379/201 |
| 5,680,440 | 10/1997 | Ghisler et al. | 379/58 |
| 5,819,180 * | 10/1998 | Alperovich et al. | 455/433 |
| 5,978,673 * | 11/1999 | Alperovich et al. | 455/414 |
| 5,991,621 * | 12/1999 | Alperovich | 455/445 |
| 5,999,811 * | 12/1999 | Moine | 455/552 |

FOREIGN PATENT DOCUMENTS

WO 96/20574   7/1996   (WO).

OTHER PUBLICATIONS

Standard Search Report for RS 100757 US Completed Nov. 6, 1998 Nov. 9, 1998 EPO.

H. Maass et al., "Directory Services for Mobility Management in Private Telecommunication Networks", Proceedings of the International Conference on Communications (ICC), Geneva, May 23–26, 1993, vol. 2, May 23, 1993, pp. 1252–1256, XP000371272; *Institute of Electrical and Electronics Engineers (IEEE)*, 1993.

* cited by examiner

*Primary Examiner*—Daniel S. Hunter
*Assistant Examiner*—Myron K. Wyche
(74) *Attorney, Agent, or Firm*—Jenkens & Gilchrist, P.C.

(57) ABSTRACT

A system and method are disclosed in which a service provider in a first environment of a first plurality of competing, overlapping mobile networks has at least one service node. The service provider offers subscriptions based on SIM modules from at least one of a second plurality of mobile telephone operators in a second environment. The first plurality of operators has agreements for interconnect traffic with the second plurality of operators. Mobile users that are visitors in the first environment can communicate, through any appropriate network selected from the first plurality of mobile networks, which avoids the detouring of incoming calls to the visiting mobile users.

24 Claims, 3 Drawing Sheets

SYSTEM AND METHOD FOR ACCESSING MOBILE NETWORKS

BACKGROUND OF THE INVENTION

1. Technical Field of the Invention

The present invention relates in general to the mobile telecommunications field and, in particular, to a method for utilizing a plurality of overlapping mobile networks.

2. Description of Related Art

Competition has been a driving force behind the fast developing field of telecommunications. Deregulation has opened up the telecommunications market and now allows independent operators to establish competing networks. The wireless telephony market is one that is fiercely competitive. As a consequence of deregulation, it is becoming more common for numerous co-existing, independent wireless networks to overlap in coverage. This deregulated environment provides opportunities for mobile phone users to select the most appropriate network operator (e.g., in order to obtain the lowest cost at any particular time). A prerequisite for such flexibility is an agreement to cooperate between at least two independent network operators, so that a user having a subscription a with a first network operator can, while visiting in a network owned by a second operator, connect to that second network. In principle, a mobile user could then select the most appropriate network at each instant to make outgoing mobile calls. However, one problem is that the same flexibility does not apply to an incoming call, because such a call must include an identity appropriate to the network indicated on the receiving mobile phone's Subscriber Identity Module (SIM) card.

A user's mobile phone includes a unique SIM card, which is a key for gaining access to a network to which the user subscribes. While visiting in other networks, if cooperative agreements exist, the user can make and receive wireless calls. However, one existing problem is that some mobile network operators (e.g., in Sweden) do not allow a user to select between networks in regions where there are several competing networks available. An exception is made only for visitors that subscribe with foreign (e.g., non-Swedish) network operators having cooperation agreements with the Swedish network operators.

Another existing problem is that double mobile phone fees can be invoked for an incoming call to a mobile user. This problem arises when a mobile call is made to a user who is visiting in a network other than the one where the user's subscription is registered. This problem is illustrated by FIG. 1, where in order to call mobile user B, the user of fixed telephone A uses the identity of user B's mobile phone. In this case, the identity of user B's mobile phone is supposed to direct the call to network N0. This first call is charged as a mobile phone call. Network N0 has updated location information about user B's mobile phone, which is used by network N0 to forward the call to network Ni where user B's mobile phone is currently logged in. User B will be charged for a mobile call between network N0 and network N1. Consequently, the completed call invokes charges for two mobile connections. In addition to this shortcoming, the user of fixed telephone A has no opportunity to select the most appropriate network (e.g., N1, N2, N3) even if they are all available due to an assumed agreement of cooperation between the respective network operators.

SUMMARY OF THE INVENTION

It is, therefore, an object of the present invention to provide a method for making mobile phone connections so that the simultaneous presence of a plurality of independent mobile networks is advantageously utilized.

It is another object of the present invention to provide a method wherein charges are invoked for only one mobile connection in a communication between a calling party's fixed telephone and a called party's mobile phone, while the called party's mobile phone is visiting in a network different from the ordinary network as defined by the mobile phone's SIM card.

In accordance with the present invention, the foregoing and other objects are achieved by a method and system that enables a mobile user to select one from a plurality of available mobile networks that are exchanging location update information with yet another mobile network, preferably under an interconnection agreement.

An important technical advantage of the present invention is that the selection of a mobile network can be made to achieve the lowest cost for mobile communications.

Another important technical advantage of the present invention is that the possibility of selecting a mobile network can extend the range for mobile operation in those situations where the available mobile networks only partly overlap with one another.

Yet another important technical advantage of the present invention is that an operator of a national mobile network can extend its services into regions covered by other operators. As such, the present method can be used to "piggyback" on existing networks so that an operator can introduce services in new areas without needing massive investments in a new infrastructure, or having to negotiate about scarce frequency resources. Notably, the present method can increase competition in an area.

It is still another important technical advantage of the present invention that a long-term visitor in a "foreign" licensed area can have a national mobile number from the operator of the service node, whereby the visitor can be reached with the most direct connection.

It is a further important technical advantage of the present invention that an operator of a mobile network in a second licensed area does not need to have a complete radio network in order to establish a presence in a first licensed area. It is sufficient if the operator has at least one home location register (HLR) in the second licensed area connected to a signalling network common to all available networks in the first licensed area, appropriate interconnection agreements, and rights to market appropriate SIM cards.

BRIEF DESCRIPTION OF THE DRAWINGS

A more complete understanding of the method of the present invention may be had by reference to the following detailed description when taken in conjunction with the accompanying drawings wherein.

DETAILED DESCRIPTION OF THE DRAWINGS

Figure 1:
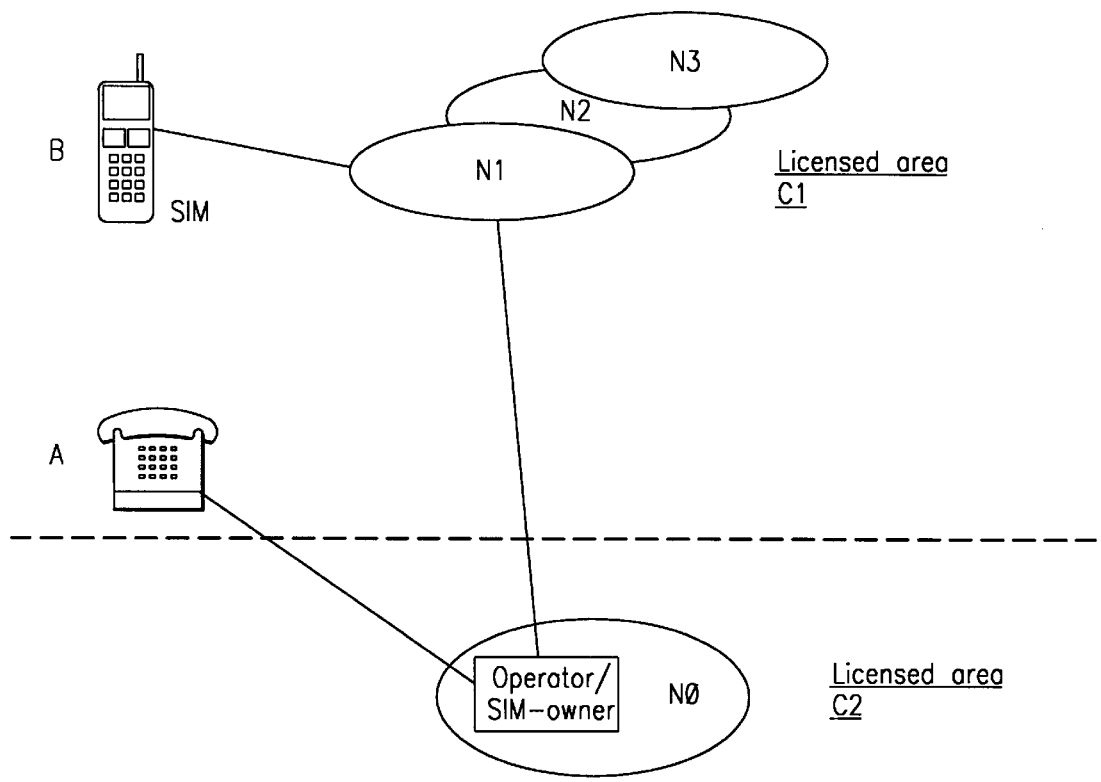
FIG. 1 is a diagram that illustrates a conventional problem in which double mobile phone fees can be invoked for an incoming call to a mobile user.
Figure 2:
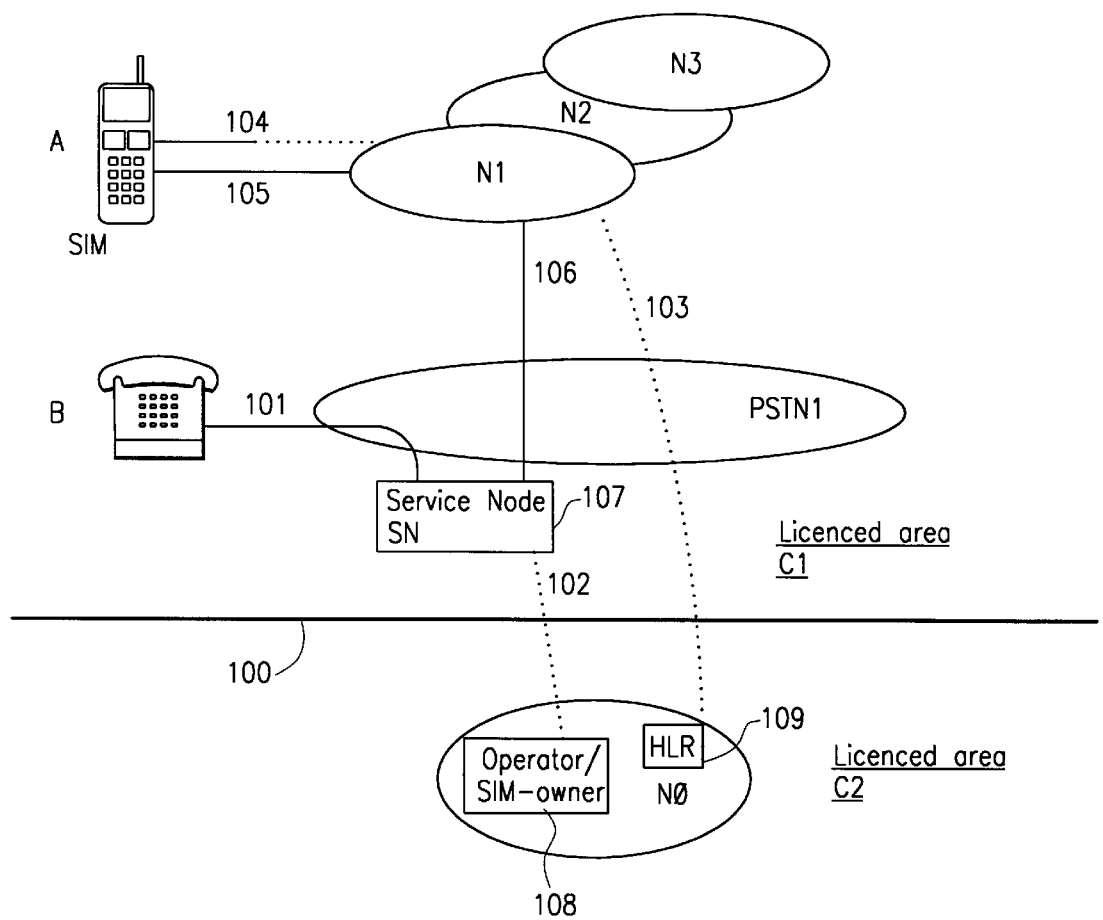
FIG. 2 is a diagram that illustrates an exemplary system arrangement that can be used to implement a method for accessing mobile networks, in accordance with a preferred embodiment of the present invention.
Figure 3:
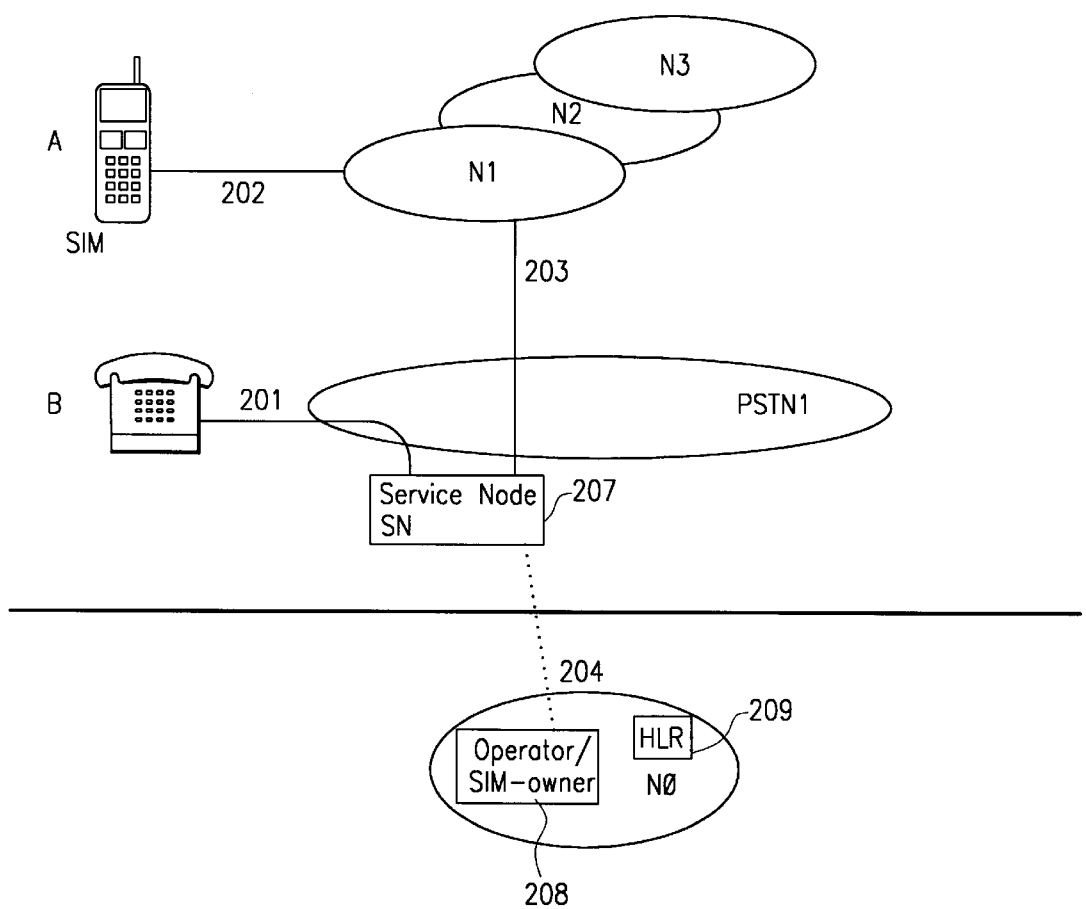
FIG. 3 is a diagram that illustrates a method and system that can be used to implement a different embodiment of the present invention.

The preferred embodiment of the present invention and its advantages are best understood by referring to FIGS. 1–3 of the drawings, like numerals being used for like and corresponding parts of the various drawings.

FIG. 2 is a diagram that illustrates an exemplary system arrangement that can be used to implement a method for accessing mobile networks, in accordance with a preferred embodiment of the present invention. For this embodiment, networks N1, N2 and N3 are assumed to be competing mobile communications networks with a certain extent of overlapping coverage within one national region. The overlap shown in FIG. 2 is for illustrative purposes only and should not be considered to so limit the scope of the present invention. For example, networks N1, N2 and N3 could be arranged so that each such network partially overlaps the other two. Solid line 100 represents an imaginary borderline between two different licensed areas: first licensed area C1; and second licensed area C2. In this embodiment, mobile networks N1, N2 and N3, and fixed Public Switched Telephone Network 1 (PSTN1) are included in first licensed area C1, while mobile network N0 is included in second licensed area C2. Network N0 includes an HLR 109. Although only mobile network N0 is shown in licensed area C2, it is for illustrative purposes only, and licensed area C2 could include a plurality of mobile networks. For example, the two licensed areas, C1 and C2, can represent separate licensed areas of networks in one country (e.g., Sweden, United States, etc.), or in different countries (e.g., Sweden/Norway, Sweden/Germany or United States/Canada, etc.). Preferably, mobile network N0 can be assumed capable of exchanging certain signalling information with networks N1, N2 and N3. At a minimum, the exchange of signalling information includes location data related to a visiting mobile terminal logging in to one of the networks (e.g., visiting mobile terminal A logging in to mobile network N1). Such an exchange of signalling information can be accomplished using conventional telecommunications signalling handling techniques.

A service node 107 is associated with the fixed telephone network PSTN1. Calls can be directed to service node 107 using at least one subscriber number. Consequently, personal numbers can be used for subscribing to services accessed at the service node 107. The operator of the service node 107 located in first licensed area C1 has a subscription for services with at least one mobile network operator in second licensed area C2. For example, in the embodiment shown in FIG. 2, the operator of service node 107 (in C1) has a subscription for services with the operator 108 of mobile network N0 (in C2). Preferably, a subscription for services at the service node 107 includes a SIM card from a mobile network operator (e.g., network N0) in a second licensed area (e.g., C2). Consequently, a user's phone (e.g., A) that includes such a SIM card appears as a visitor to networks N1, N2 and N3, and that user has the opportunity to select any available network from N1, N2 or N3 for outgoing calls.

A mobile phone user (e.g., A) that has subscribed for services from the service node 107, has a personal number stored in a memory location at the service node. An incoming call 101 from fixed telephone user B to mobile phone user A (using A's personal number) is terminated in the service node 107. In response to the terminated incoming call, the service node initiates a call using the Integrated Services Digital Network (ISDN) number associated with the SIM card that user B has received from the operator of service node 107. The service node then directs this call to the associated mobile network (N0) in the second licensed area C2, as indicated by the communication line 102. Stored in a memory location in mobile network N0 is updated location information about user A's mobile phone, which has logged in to mobile network N1 as a visitor. As such, mobile network N0 forwards the call from service node 107 (as indicated by the communication line 103) to the mobile network N1. In response to receiving that call, network N1 pages user A's mobile phone (as indicated by communication line 104). Notably, at this stage, the communication lines 102, 103 and 104 have been carrying signalling information only, and no traffic channel has been allocated. In response to receiving the paging signal from mobile network N1, user A's mobile phone initiates a call back procedure to set up the call. The call back procedure disconnects the communications over lines 102, 103 and 104, and establishes a new connection between user A and service node 107 via a communication line 106 and radio air interface link (indicated by line 105). The service node 107 then connects user A's mobile phone with calling party B's fixed telephone via lines 101 and 106, and air interface 105. Therefore, although mobile user A is a subscriber to network N0, mobile user A will be charged with only one mobile network's (N1's) fee for the incoming call.

In a second embodiment of the present invention, user A's mobile phone randomly selects one of mobile networks N1, N2 or N3 to execute the call connection via communication lines 105 and 106.

In a third embodiment of the present invention, the service node 107 recommends the most favorable (e.g., with regard to cost) mobile network (e.g., N1, N2 or N3) to execute the call connection via communication lines 105 and 106. This recommendation can be conveyed to user A's mobile phone using one of a plurality of known techniques. For example, user A's mobile phone can be connected to the service node 107 in order to receive a voice message that conveys the recommendation. As another example, via connections 102, 103 and 104, user A's mobile phone can receive a Short-Message-Service message conveying the recommendation through the network (N1, N2 or N3) it is currently logged into.

In a fourth embodiment of the present invention, user A's mobile phone is modified to receive an order from the service node 107, which directs the mobile terminal to select a specific network (N1, N2 or N3) to use. The order is delivered by the service node 107, which sets up a signalling connection with user A's mobile terminal through the mobile network currently selected. This signalling connection is set up automatically without any interaction with user A.

FIG. 3 is a diagram that illustrates a method and system that can be used to implement a fifth embodiment of the present invention. In this embodiment, the service node 207 is operated by the operator of mobile network N0. Service node 207 retrieves location information about user A's mobile phone from HLR 209 in network N0 via a signalling connection (indicated by communication line 204). Preferably, this location information includes a roaming number for user Als mobile phone, which is obtained by network N0 from network N1 using a conventional signalling message approach. In response to receiving a first call request via communication line 201 to set up a call with user A's mobile phone, the service node 207 uses the roaming number for user Als mobile phone to make a second call connection via communication lines 203 and 202 to user A's mobile phone, and then connects the first and second calls (via 201, 203 and 202) to complete the overall call.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for establishing a routing of a call to a first mobile terminal via a first mobile network located in a first licensed area, comprising the steps of:

issuing a subscriber identity module for use with said first mobile terminal, said subscriber identity module associated with a second mobile network located in a second licensed area;

storing a personal number for said first mobile terminal in a service node identified with a fixed telephone network, said service node associating said personal number with a mobile subscriber integrated services digital network number from said subscriber identity module;

storing location information for said first mobile terminal in said second mobile network, said location information associated with said first mobile network; and establishing the routing of the call from a second terminal to said first mobile terminal via said first mobile network, said second terminal using said personal number to direct the call to said service node, said service node directing the call to said first mobile terminal via said first mobile network without relying on a service code.

2. The method of claim 1, wherein said first and second licensed areas comprise separate licensed areas of networks located in different national environments.

3. The method of claim 1, wherein said first and second licensed areas comprise separate licensed areas of networks located in a single national environment.

4. The method of claim 1, wherein said first mobile network further comprises a plurality of mobile networks.

5. The method of claim 1, wherein the step of storing location information comprises storing said location information in a home location register.

6. The method of claim 1, wherein said first mobile terminal randomly selects one of a plurality of mobile networks to direct the call.

7. The method of claim 1, wherein said service node determines a selected mobile network to execute a call connection and orders said first mobile terminal to use said selected mobile network.

8. The method of claim 1, wherein said first mobile terminal is ordered by said service node to select a network to execute a call connection.

9. The method of claim 1, wherein said service node uses a roaming number associated with said first mobile terminal to execute a call connection between said fixed terminal and said first mobile terminal.

10. A first national telecommunications environment comprising a plurality of independent national mobile networks and a service node having at least one identity in a fixed public telecommunications network, a second telecommunications environment comprising at least one home location register having a signalling interchange with said plurality of independent national mobile networks whereby at least location update information can be exchanged, said plurality of mobile networks accepting a log-in of a visiting mobile user registered in said at least one home location register, a method for accessing at least one of said plurality of mobile networks, comprising the steps of:

an operator of said at least one home location register issuing a first mobile user roaming in said first telecommunications environment a subscriber identity module, said first mobile user having a personal number stored in said service node;

a second user making a call to said first mobile user by using said personal number, said fixed public telecommunications network routing said call to said service node for termination;

said service node storing a data link between said personal number and a mobile subscriber integrated services digital network number stored in said subscriber identity module, said service node, in response to said termination of said call using said personal number, initiating an outgoing call using said mobile subscriber integrated services digital network number;

in response to receiving said outgoing call, said second telecommunications environment retrieving location update information associated with said first mobile user, and routing said outgoing call back to said first telecommunications environment, said first telecommunications environment terminating said outgoing call with said first mobile user;

in response to receiving said outgoing call, said first mobile user disconnecting said outgoing call and immediately initiating a callback to said service node and identifying said second user with said personal number; and in response to receiving a terminal identification of said first mobile user, said service node making a call connection between said first mobile user and said second user.

11. A system for establishing a routing of a call to a first mobile terminal via a first mobile network located in a first licensed area, comprising:

a second mobile network located in a second licensed area, said second mobile network including means for storing location information for said first mobile terminal, said location information associated with said first mobile network;

a fixed telephone network;

means, coupled to said fixed telephone network, for storing a personal number associated with said first mobile terminal;

a subscriber identity module for use with said first mobile terminal, said subscriber identity module associated with said second mobile network and including a mobile subscriber ISDN number;

means for associating said personal number with said ISDN number; and means for establishing the routing of the call from a second terminal to said first mobile terminal via said first mobile network, said second terminal including means for using said personal number to direct the call to said service node, said service node including means for directing the call to said first mobile terminal via said first mobile network without relying on a service code.

12. The method of claim 1, wherein said second terminal comprises a non-mobile terminal.

13. A method for establishing a routing of a call to a first mobile terminal via a first mobile network located in a first licensed area, comprising the steps of:

issuing a subscriber identity module for use with said first mobile terminal, said subscriber identity module associated with a second mobile network located in a second licensed area;

storing a personal number for said first mobile terminal in a service node identified with a fixed telephone network, said service node associating said personal number with a mobile subscriber integrated services digital network number from said subscriber identity module;

establishing the routing of the call from a second terminal to said first mobile terminal via said first mobile network, said second terminal using said personal number to direct the call to said service node;

directing the call to said first mobile terminal via said first and second mobile networks;

rejecting said call by said first mobile terminal; and directing a callback to said service node by said first mobile terminal.

14. The method of claim 13, wherein said first and second licensed areas comprise separate licensed areas of networks located in different national environments.

15. The method of claim 13, wherein said first and second licensed areas comprise separate licensed areas of networks located in a single national environment.

16. The method of claim 13, wherein said first mobile network further comprises a plurality of mobile networks.

17. The method of claim 13, wherein said first mobile terminal randomly selects one of a plurality of mobile networks to direct said callback.

18. The method of claim 13, wherein said service node determines a selected mobile network to execute said callback and orders said first mobile terminal to use said selected mobile network.

19. The method of claim 13, wherein said first mobile terminal is ordered by said service node to select a network to execute said callback.

20. The method of claim 13, further comprising the step of through-connecting, by said service node, said call from said second terminal with said callback from said first mobile terminal.

21. The method of claim 20, wherein the step of through-connecting, by said service node, said call from said second terminal with said callback from said first mobile terminal further comprises the step of using a calling number identification to associate said call from said second terminal with said callback.

22. The method of claim 13, wherein said second terminal comprises a non-mobile terminal.

23. The method of claim 11, wherein said second terminal comprises a non-mobile terminal.

24. A system for establishing a routing of a call to a first mobile terminal via a first mobile network located in a first licensed area, comprising:

means for issuing a subscriber identity module for use with said first mobile terminal, said subscriber identity module associated with a second mobile network located in a second licensed area;

means for storing a personal number for said first mobile terminal in a service node identified with a fixed telephone network, said service node including means for associating said personal number with a mobile subscriber integrated services digital network number from said subscriber identity module;

means for establishing the routing of the call from a second terminal to said first mobile terminal via said first mobile network, said second terminal including means for using said personal number to direct the call to said service node;

means for directing the call to said first mobile terminal via said first and second mobile networks; means for rejecting said call by said first mobile terminal; and means for directing a callback to said service node by said first mobile terminal.

* * * * *

UNITED STATES PATENT AND TRADEMARK OFFICE
CERTIFICATE OF CORRECTION

PATENT NO.    : 6,181,936 B1
DATED         : January 30, 2001
INVENTOR(S)   : Jonsson et al.

It is certified that error appears in the above-identified patent and that said Letters Patent is hereby corrected as shown below:

Column 1,
Line 55, replace "Ni" with -- N1 --

Column 4,
Line 56, replace "Als" with -- A's --
Line 61, replace "Als" with -- A's --

Signed and Sealed this

Fourth Day of June, 2002

Attest:

Attesting Officer

JAMES E. ROGAN
Director of the United States Patent and Trademark Office